Nov. 17, 1970 R. C. HOWARD 3,540,314

METHOD OF LOCATING AND MOUNTING DIE SET COMPONENTS

Filed Aug. 23, 1968 2 Sheets-Sheet 1

INVENTOR.
REGINALD C. HOWARD
BY Fulwider, Patton, Riebe, Lee and Utecht
ATTORNEYS

METHOD OF LOCATING AND MOUNTING DIE SET COMPONENTS

Filed Aug. 23, 1968

2 Sheets-Sheet 2

INVENTOR.
REGINALD C. HOWARD
BY Fulwider, Patton, Rieber, Lee and Utecht
ATTORNEYS United States Patent Office 3,540,314
Patented Nov. 17, 1970

3,540,314
METHOD OF LOCATING AND MOUNTING DIE SET COMPONENTS

Reginald C. Howard, 11924 Montana Ave., Apt. 5, Los Angeles, Calif. 90049

Filed Aug. 23, 1968, Ser. No. 754,899
Int. Cl. B21k 5/20
U.S. Cl. 76—107 10 Claims

ABSTRACT OF THE DISCLOSURE

A method of locating and mounting die set guide pin or bushing components in a die set plate, and which includes the steps of utilizing an already fabricated die set or master plate to temporarily position the die set components within oversize openings in the die set plate; and then pouring a hardenable casting material in such openings around the temporarily positioned die set components to permanently mount them to the die set plate.

BACKGROUND OF THE INVENTION

Field of the invention

The present invention relates to die set plates, and more particularly to a rapid, accurate, and relatively inexpensive method of locating and aligning guide pin or bushing components in die set plates.

Description of the prior art

Conventional die sets usually comprise a pair of relatively heavy plates whose confronting or complemental faces are precision ground so as to be absolutely flat and parallel. The plates generally include slidably cooperative bushings and guide pins which enable precise and exactly repeatable movement of the die plates toward and away from each other for operation on a workpiece located between the plates.

Precision, repeatable mating of the complemental plates is extremely important in most workpiece operations. Consequently, great care is exercised in accurately locating, aligning and mounting the guide pins in the one die set plate and the bushings in the other die set plate.

The prior art procedure for locating and mounting the guide pins and bushings includes the step of inserting a plurality of precision ground spacers between the plates to orient their ground faces opposite one another and in parallel relation. Typically this is followed by clamping the plates and spacers together and drilling aligned pilot openings through the plates where the bushings and pins are to be located. Next, the openings are enlarged by a two-size or composite boring tool, and finally a honing operation is performed to bring the openings to close tolerances, commonly in the order of 0.0002 inch or better.

The plurality of guide pins are press fitted into the openings in one plate, and the corresponding plurality of bushings are press fitted into the openings in the other plate, with the pins sliding within the bushings and maintaining the precise alignment of the two plates during their movement relative to one another.

Unfortunately, the foregoing process of the prior art is tedious and expensive and does not always afford the accuracy desired. For example, press fitting and bushings into their openings tends to close in the bushings so that their central openings are too small to slidably receive the guide pins. A correct fit requires lapping of the bushings. Alternatively, a more generous "wring fit" of the bushings can be used, with clamps being employed to secure the bushings in position. However, this undesirably allows a certain amount of movement of the bushings within their openings, and also entails the use of extra clamp equipment.

The very nature of the prior art method of locating and mounting die set components renders it practically impossible to produce die set plates without considerable investment in time, expensive machine tools, and highly skilled personnel. Moreover, the die set plates produced are "matched" plates with which no other die set plate is generally interchangeable in the event that one of the matched plates is damaged.

SUMMARY

According to the present invention, die set components are located and mounted in precisely aligned positions by utilizing either a master plate or a fabricated first die set plate which is the opposite but complemental plate for the one being fabricated. The master or first plate is used to temporarily position the die set components within oversize openings in the die set plate being fabricated, and a hardenable casting material is poured into the oversize openings to permanently secure the components in position.

With this arrangement it is only necessary to provide non-precision, generous tolerance opening in the die set plate in locations correspoding to the desired locations of the die set components. For example, if guide pins are to be inserted through the use of a master plate, the master plate will have precision openings to locate the desired openings in the die set plate. The guide pins are disposed through the precision master openings and into rough, generous tolerance openings provided in the die set plate. Hardeable casting material is poured into the openings and about the guide pins to anchor the guide pins in precise alignment with the openings in the master plate. This method allows the master plate to be used to make any number of die set plates which are each interchangeable with the other.

If desired, an opposite or complemental die set plate could have been used instead of the master plate. Also, it will be apparent that the fabricated die set plate with the guide pins can itself now be used to precisely locate bushings in generous tolerance openings provided in yet another die set plate. Use of casting material will then anchor such bushings in position so that the two plates can now be used as the complemental parts of a die set.

This arrangement completely eliminates any possibility of bushing close-up due to press fitting; it allows interchangeability of plates; and it obviates any need for precision honing of the openings for the guide pins and bushings. Moreover, in accordane with the present invention the die set components, and particularly the guide pins, can be impingement plated with a thin layer of graphitic material to provide a dry film lubricative surface, thereby greatly facilitating slidable interaction between the die set components.

Other objects and features of the invention will become apparent from consideration of the following description taken in connection with the accompanying drawings.

DESCRIPTION OF THE PREFERRED METHODS

Figures 1, 2, 3:
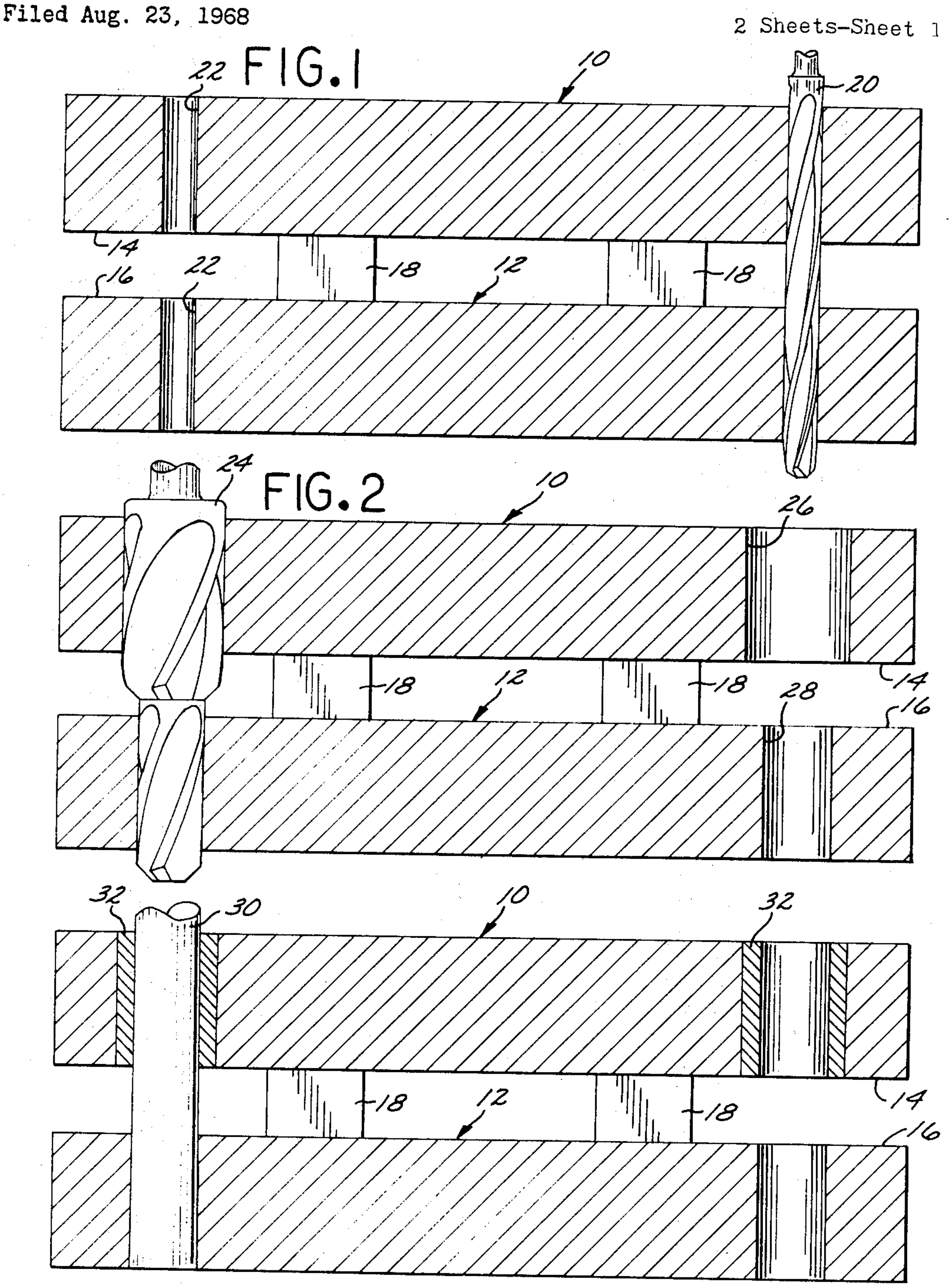
FIGS. 1 through 3 illustrate respectively, the prior art successive steps of providing pilot openings in die set plates, which are shown in cross section; enlarging such openings; and press fitting the die set components into the enlarged openings.

Referring now to the drawings, and particularly to FIGS. 1 through 3, there is illustrated a typical prior art method of locating and aligning the coaxially slidably cooperative components of a conventional die set. More particularly, the die set includes an upper die set plate 10 and a lower die set plate 12 which are provided with confronting precision ground flat and parallel faces 14 and 16, respectively.

According to the prior art, the slidably cooperative die set components are located and mounted in the plates 10 and 12 by a method which includes the step of disposing precision ground spacers 18 between the faces 14 and 16 of the plates to space the plates apart in absolutely parallel relation. This is illustrated in FIG. 1. The spaced plates are then fixedly held together by any suitable clamping means (not shown). A drill 20 is next used to provide a plurality of pilot openings 22 at those locations where the die set components are to be located.

As best illustrated in FIG. 2, the pilot openings 22 are then utilized to guide a composite or two-size boring tool 24 to provide bushing receiving openings 26 in the die set plate 10 and smaller diameter guide pin receiving openings 28 in the die set plate 12.

Next, a honing operation (not illustrated) is performed on the openings 26 and 28 to bring them to close tolerance with the components which they are intended to receive, the tolerance typically being approximately 0.0002 inches. A plurality of guide pins 30 are then press fitted into the openings 28, and a corresponding plurality of bushings 32 are press fitted into the openings 26.

If the steps just recited have been carefully followed, and care is exercised in forming the openings 26 and 28, the bushings 32 will coaxially slidably cooperate with the guide pins 30 so that the die set plates 10 and 12 can be moved toward and away from each other while maintaining an exactly parallel relation of the faces 14 and 16. As previously indicated, the press fitting of the bushings 32 often causes them to "close in," in which case a lapping operation must be performed on the bushings to open them up sufficiently to easily slidably accommodate the guide pins 30.

The foregoing description is made to emphasize the time and expense involved in practicing prior art methods, and to facilitate an understanding of the capability of the present method for producing high precision, interchangeable die set plates at relatively low cost.

Figures 4, 5:
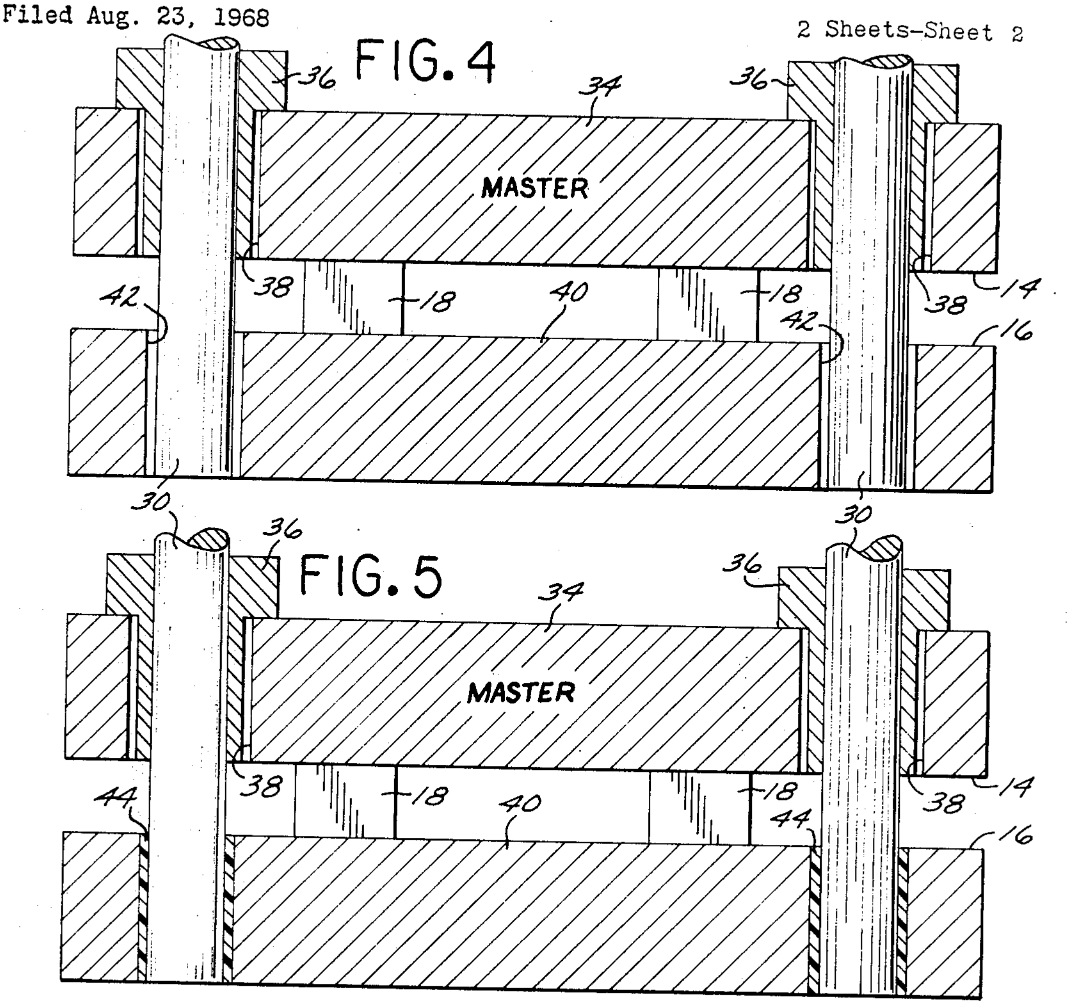
FIG. 4 illustrates the first step of the method of the present invention, comprising the provision of a plurality of openings in a die set plate in alignment with a corresponding plurality of openings in a master plate, the plates being shown in cross section.
FIG. 5 is a cross-sectional view similar to FIG. 4, but illustrating the openings in the die set plate filled with a hardenable casting material to anchor the guide pins in position.
Figure 6:
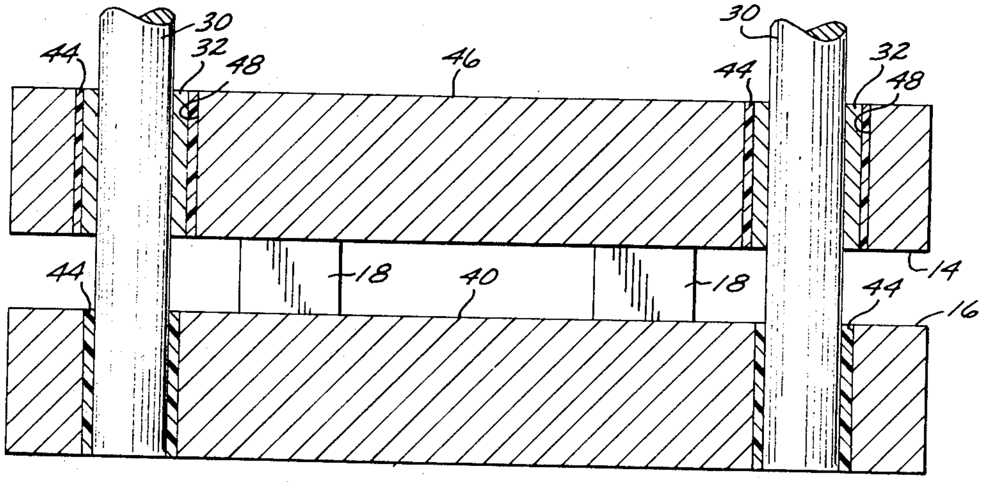
FIG. 6 is a cross-sectional view like that of FIG. 4, but illustrating utilization of the guide pins in one die set plate to locate and align a corresponding plurality of bushings in a complemental die set plate.

Referring now to FIGS. 4 through 6, one method according to the present invention utilizes a master plate 34 in which there are mounted a plurality of master bushings 36. The bushings 36 are employed simply to provide precision central master openings 38, and other means providing such precision openings could be used if desired. Consequently, the bushings 36 and the manner of their location do not form a part of the present invention. Moreover, as will be seen, an already fabricated die set plate could also be used, the openings thereof providing a function like that of the master openings 38.

After determining the desired location of the plurality of guide pins 30 which are to be disposed in a die set plate 40, a corresponding plurality of nonprecision pin-receiving openings 42 are provided at these points, the diameter of each opening 42 being made generous or oversize relative to the diameter of the corresponding guide pin 30. The oversize openings 42 do not require expensive or time consuming machine operations, nor, because of the generous tolerance, does extreme care have to be exercised to locate the openings with the precision of corresponding pin-receiving openings of the prior art.

The confronting surfaces of the master plate 34 and the die set plate 40 are characterized by precision ground, flat faces. These are spaced apart in parallel relation by a plurality of the spacers 18, as previously described, and the parallel plates 34 and 40 are then clamped together by any suitable means (not shown).

Next, as best viewed in FIG. 4, a plurality of guide pins 30 are slid coaxially along or through the master openings 38 of the bushings 36 and into the die set plate openings 42. As seen in FIG. 5, a hardenable casting material 44 is then poured into the openings 42 and about the inserted guide pins 30. The casting material is allowed to harden to rigidly anchor the pins 30 in position coaxially aligned with the master bushings 36.

The casting material 44 may be any of a variety of commercially available materials which are convertible from a liquid to a hardened or solid state by cooling or curing. One particularly suitable material is an epoxy-type casting resin which is commercially available, adheres well, and is capable of withstanding high impact without failure.

After the maerial 44 has hardened or cured, the master plate 34 is removed. The remaining plate 40 can obviously be duplicated any number of times by using the master plate 34 on successive die set plates, thereby insuring interchangeability of any of such die set plates with the others.

The die set plate 40 can also be used to locate a plurality of the bushings 32 in a complemental die set plate 46. First, generous tolerance bushing receiving openings 48 are provided at the proper locations in the plate 46, and the plate 46 is then clamped (not shown) to the plate 40 with the spacers 18 between them, and with the openings 48 axially aligned with the guide pins 30 of the plate 40. The bushings 32 are then slipped over the pins 30 and into the openings 48 in the plate 46. Next, casting material 44 is poured into the openings 48 and about the inserted bushings 32. The casting material is then allowed to harden to anchor the bushings 32 in position.

With the foregoing method, it is thus possible to form a die set plate 40 with guide pins 30 by using a master bushing plate 34 with master openings, or to form a die set plate 46 by using a master guide pin plate (not shown) having guide pins mounted to it. Alternatively, either plate of a die set can be fabricated using a complemental or opposite die set plate as the master plate, as will be apparent.

Next, the guide pins 30 are preferably impingement plated with a graphitic material to provide a dry film lubricative surface. The surfaces defining the openings in the bushings 32 could also, or alternatively, be plated, but best results are obtained by plating the guide pins.

The thickness of the plating is less than 0.0001 inch and consequently is not shown on the drawings. The plating is capable of withstanding very high loads without galling, being fused to the base material of the guide pins 30 in the form of an alloy or the like. The material is commercially available as a very pure electric furnace graphite mixed with suitable stabilizing metal powders and adhesive liquids.

The foregoing method of the invention facilitates rapid and economical manufacture of precision die sets having tolerances as good as and usually better than that achieved by the relatively expensive and tedious methods of the prior art. Moreover, the present method enables manufacture of interchangeable die set plates, which was heretofore economically impractical.

Various modifications and changes may be made with regard to the foregoing detailed description without departing from the spirit of the invention or the scope of the following claims.

I claim:

1. The method of locating and mounting first components in a first die set plate in precise alignment with coaxially slidably cooperative second components already mounted to a complemental second die set plate, wherein said components comprise die set guide pins and bushings, said method comprising the steps of:

providing in the first die set plate a plurality of first openings aligned with the plurality of second components which are mounted to the second die set plate, the diameter of each of said first openings being made oversize relative to the diameter of one of said first components;

sliding a plurality of said first components coaxially along said second components and into said first openings;

pouring a casting material in said first openings and about said first components; and allowing said casting material to harden about said first components.

2. The method of claim 1 wherein said first openings are guide pin mounting openings and said first components are guide pins coaxially slidable along bushings which constitute said second components.

3. The method of claim 2 including the step of impingement plating a graphitic material onto said guide pins to provide a dry film lubricative surface.

4. The method of claim 1 wherein said first openings are bushing mounting openings and said first components are bushings coaxially slidable along guide pins which constitute said second components.

5. The method of claim 4 including the step of impingement plating a graphitic material onto said guide pins to provide a dry film lubricative surface.

6. The method of claim 1 wherein said second die set plate is a precision master die set plate, and further including the steps of:

removing said master die set plate after said casting material has hardened;

providing in a third die set plate which is complemental to said first die set plate a plurality of third openings aligned with said plurality of first components, the diameter of each of said third openings being made oversize relative to the diameter of each of a plurality of third components which are coaxially slidably cooperative with said first components, respectively;

sliding a plurality of said third components coaxially along said first components and into said third openings;

pouring a casting material in said third openings and about said third components; and allowing said casting material to harden about said third components.

7. The method of claim 6 wherein said third openings are guide pin receiving openings and said third components are guide pins coaxially slidable along bushings which constitute said first components.

8. The method of claim 6 wherein said third openings are bushing receiving openings and said third components are bushings coaxially slidable along guide pins which constitute said first components.

9. The method of locating and mounting the guide pins of a die set plate in precise alignment with the bushings of a complemental die set plate, said method comprising the steps of:

forming in a master die set plate a plurality of master openings each of a diameter substantially the same as the diameter of a guide pin;

providing in one die set plate a plurality of pin receiving openings aligned with said master openings and each of a diameter which is oversize relative to the diameter of said guide pin;

inserting a plurality of guide pins through said master openings and into said pin receiving openings;

pouring a casting material in said pin receiving openings and about said guide pins;

removing said master die set plate after said casting material has hardened;

providing in the other die set plate a plurality of bushing receiving openings aligned with said guide pins and each of a diameter which is oversize relative to the diameter of a bushing;

inserting a plurality of bushings in said bushing receiving openings;

pouring a casting material in said bushing receiving openings and about said bushings;

inserting said guide pins in said bushings before said casting material has hardened about said bushings; and allowing said casting material to harden about said bushings.

10. The method according to claim 9 including the step of impingement plating a graphitic material onto said guide pins to provide a dry film lubricative surface.

References Cited

UNITED STATES PATENTS

| | | | |
|---|---|---|---|
| 3,228,262 | 1/1966 | Bennett | 76—107 |
| 3,328,101 | 6/1967 | Sullivan | 264—242 XR |
| 3,400,655 | 9/1968 | Leskinen | 76—107 XR |

BERNARD STICKNEY, Primary Examiner

U.S. Cl. X.R.

29—465; 264—242, 269